Figure 1:
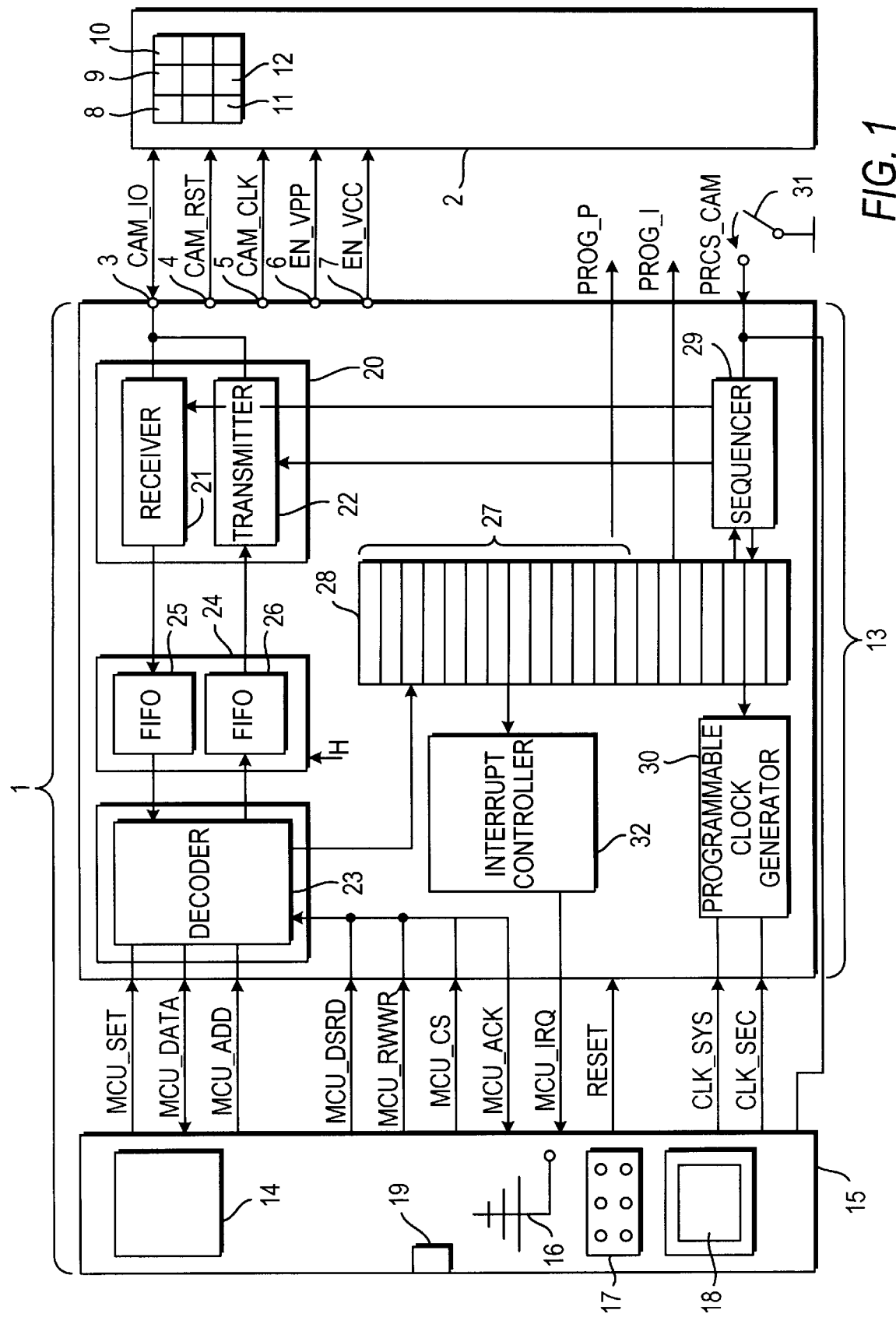

United States Patent
Praden

Patent Number: 6,098,888
Date of Patent: Aug. 8, 2000

[54] INTEGRATED CIRCUIT CARD READER WITH COUPLING CIRCUIT TO LIMIT THE FUNCTION OF MICROPROCESSOR OF THE READER

[75] Inventor: Anne-Marie Praden, Ventabren, France

[73] Assignee: Gemplus S.C.A., Gemenos, France

[21] Appl. No.: 08/849,428

[22] PCT Filed: Oct. 18, 1996

[86] PCT No.: PCT/FR96/01634

§ 371 Date: May 30, 1997

§ 102(e) Date: May 30, 1997

[87] PCT Pub. No.: WO97/15895

PCT Pub. Date: May 1, 1997

[30] Foreign Application Priority Data

Oct. 20, 1995 [FR] France .................................. 95/12403

[51] Int. Cl.$^7$ .................................................. G06K 19/06
[52] U.S. Cl. ............................................................ 235/492
[58] Field of Search .................................. 235/380, 381, 235/492; 902/25, 26

[56] References Cited

U.S. PATENT DOCUMENTS

| | | | |
|---|---|---|---|
| 4,079,237 | 3/1978 | Schlesinger | 235/492 |
| 4,367,414 | 1/1983 | Miller et al. | 307/38 |
| 4,423,480 | 12/1983 | Bauer et al. | 364/200 |
| 5,332,889 | 7/1994 | Lundstrom et al. | 235/380 |
| 5,477,215 | 12/1995 | Mandelbaum | 235/380 |
| 5,679,945 | 10/1997 | Renner et al. | 235/492 |
| 5,712,472 | 1/1998 | Lee | 235/380 |

FOREIGN PATENT DOCUMENTS

| | | |
|---|---|---|
| 0202622 | 11/1986 | European Pat. Off. . |
| 0670556 | 9/1995 | European Pat. Off. . |

OTHER PUBLICATIONS

Electronique Radio Plans, No. 541, Dec. 1992,—pp. 43–47.

Electronique Radio Plans, No. 543, Feb. 1993,—pp. 35–39.

*Primary Examiner*—Donald Hajec
*Assistant Examiner*—Diane I. Lee
*Attorney, Agent, or Firm*—Roland Plottel

[57] ABSTRACT

To limit the functions of microprocessors present in smart card readers that are designed to react to external demands in real time, a coupling circuit has been created to couple the reader to the smart card. The coupling circuit carries out all the synchronization operations.

12 Claims, 2 Drawing Sheets

INTEGRATED CIRCUIT CARD READER WITH COUPLING CIRCUIT TO LIMIT THE FUNCTION OF MICROPROCESSOR OF THE READER

The invention relates to a smartcard reader, particularly a reader connected by radio to information transmitters. The readers to which the invention relates are, more generally, readers that must fulfil a different function from that of serving as an interface for a smartcard.

Until now, readers have been based on an architecture for which ISO standard 7816-3 is met by a program operated by a microprocessor, herein called CPU for short. This standard defines the dialogue protocol between a smartcard and the reader.

For certain applications, particularly in the case where the reader is also receiving high-speed information (frequency-modulated information for example), the CPU has to manage and process these data in real time, and it may be impossible for it to dialogue with the card at the same time as it is receiving information.

In one example, the smartcard is used to access paid services: subscription to traffic information, radio subscription, or television subscription.

The transmitters sending such information monitor either continuously or randomly, without the reader or the card knowing when a check is being made. The purpose of this monitoring is to check the registered subscription status of the card. Hence, the reader may have to dialogue with the card while it is receiving radio data.

Today's card readers are made with a microcontroller which also manages the bit. This design makes it necessary to choose a dual processor architecture since the application associated with the reader requires greater speed of execution and reaction than the bit or octet exchange time with the card (calibrated procedure imposed by the standard and hence not interruptible).

Certain commercial components, for example the ST20-TPI made by SGS Thomson Microelectronic, integrate a smartcard interface known as Smart Card, whose input-outputs are fully controlled by the microprocessor. However, this type of architecture does not allow the interface to be monitored automatically.

The goal of the invention is to relieve the CPU microprocessor while retaining flexibility for implementing the various possible protocols for dialoguing between a reader and a smartcard.

The present invention is based on a different type of architecture. This architecture causes all the functions of standard 7816-3, which require synchronization constraints and bit handling, using software to manage all the functions of this standard that are specific to the various protocols, to be carried out by a coupling circuit.

With this goal, the invention relates to a card reader having:

contact pads to make contact with the contact pads of a smartcard;

a coupling circuit to apply or pick up electrical signals to or from these contact pads;

a microprocessor to carry out reception, processing, and transmission of signals available in the coupling circuit;

characterized by the coupling circuit comprising:

a first input-output circuit which is;

a set of buffer memories;

a second input-output circuit;

a set of command registers;

an operations sequencer;

the first input-output circuit being associated with the contact pads of the reader and with the set of buffer memories;

the second input-output circuit being associated with the microprocessor and with the set of buffer memories;

the second or the first circuit having a decoding circuit connected to the set of registers;

the sequencer controlling the input-output circuits as a function of electrical states stored in the set of registers.

The invention will be better understood by reading the description which follows and examining the accompanying figures. The figures show:

FIG. 1: a reader according to the invention.

Figure 2:
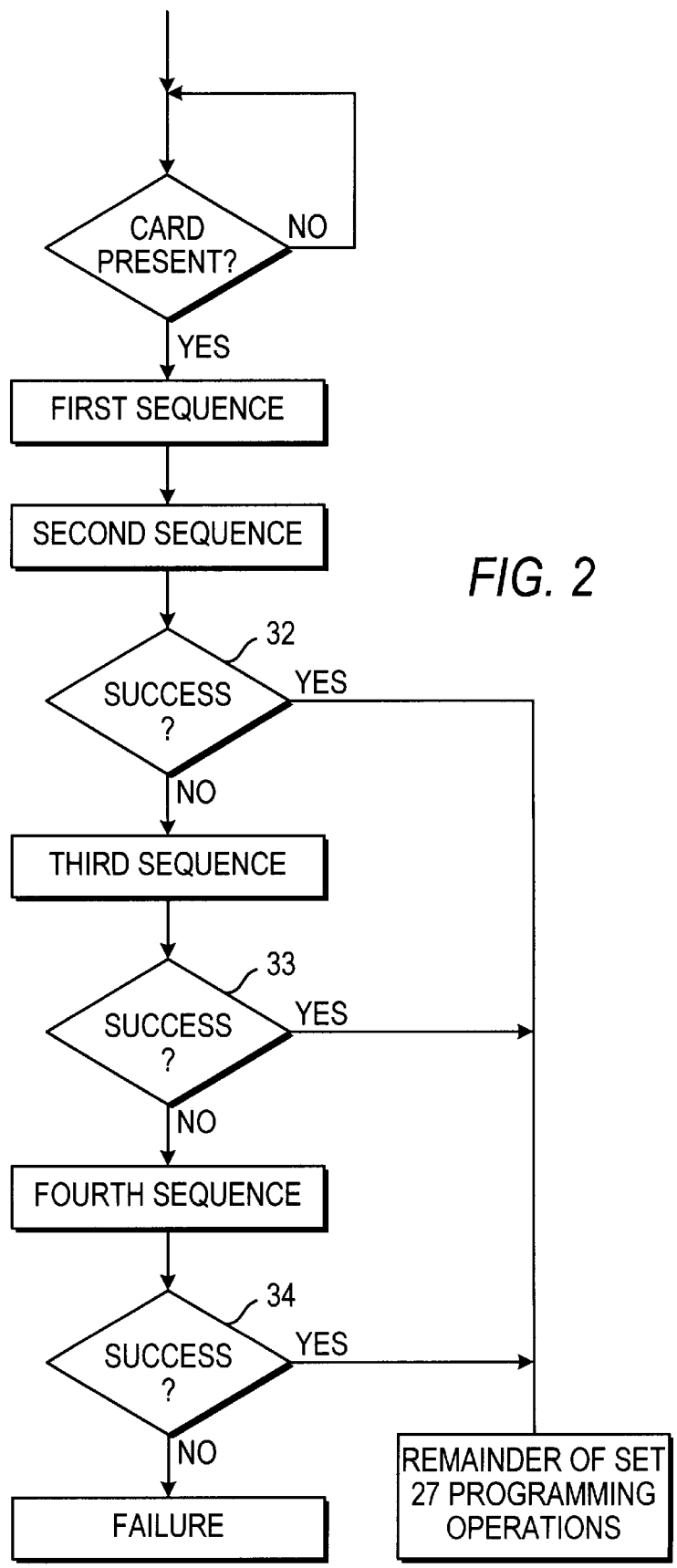

FIG. 2: a flowchart of actions executed by the sequencer according to the invention.

FIG. 1 shows a reader 1 of a smartcard 2 according to the invention. Reader 1 has contact pads such as 3 to 7 to make into contact with corresponding contact pads 8 to 12 of a smartcard. The number and positions of these pads are provided by the standard so that electrical contacts are established as soon as card 2 is inserted into a reading slot (not shown) in reader 1. Reader 1 also has a coupling circuit 13 to apply or pick up electrical signals to or from the contact pads. The electrical signals are normally managed or processed by a microprocessor 14 which is also associated with peripheral circuits inside a processing unit 15 of reader 1. The peripheral circuits have, for example, an antenna 16 with its associated receiver circuit and its circuit for communicating with microprocessor 14. They also have, for example, a keyboard 17 or a display 18 connected to microprocessor 14 under the same conditions.

Other circuits, particularly input-output circuits 19, can enable the microprocessor to become associated with the outside world, i.e. outside card 2 and reader 1. All these peripherals can interfere when a communication is occurring between microprocessor 14 and smartcard 2. The interference may cause real-time management problems.

Microprocessor 14 among other things brings about reception and/or processing and/or transmission of the electrical signals present in coupling circuit 13.

In the prior art, coupling circuit 13 is reduced to a set of wires that conduct the electrical signals from the pads to microprocessor 14.

In the invention, coupling circuit 13 is considerably more complex. It has a first data input-output circuit 20. The first circuit 20 has a receiver circuit 21 for input and a transmitter circuit 22 for output. The two circuits are connected to the input-output pads of the reader, here to a single data input-output pad 3.

Coupling circuit 13 also has a second input-output circuit 23 and a set 24 of buffer memories. In one example, set 24 has memories 25 of the first in-first out (FIFO) type to receive data from the card, and memories 26, of the same type, for transmitting data to the card. Coupling circuit 13 has a set 27 of registers such as control register 28, and an operations sequencer 29.

First input-output circuit 20 is connected with the contact pads, particularly pad 3, and with buffer memory set 24. In practice, circuit 21 is connected to memories 25 and circuit 22 is connected to memories 26. Circuits 21, 22, 25, and 26 can be controlled by sequencer 29, the latter organizing transfer of information between pad 3 and memories 25, 26. Memories 25, 26 can preferably operate independently. A clock signal H produced by a programmable clock generator 30, or by clk_sys or clk_sec connections connected to microprocessor 14, can in this case clock the operation of these memories 25, 26.

The second input-output circuit 23 is associated with microprocessor 14 and with buffer memory set 24. Preferably, second circuit 23 has a decoding circuit, particularly an address decoding circuit, associated with register set 27.

Depending on the nature and arrival time of certain signals emitted either by smartcard 2 or by microprocessor 14, these signals are decoded by this decoding circuit and stored in the registers of set 27. Circuit 23 has a decoding circuit for filtering and decoding these signals, an addressing circuit to pinpoint one or more of the registers of set 27, and a write circuit to force the status of the cells of these registers into desired electrical states.

These write functions could have been effected in set 27 by first input-output circuit 20. However, it is preferable to have them executed by the second input-output circuit 23, since circuit 23 is already associated with microprocessor 14 and hence of the same addressing and write circuits allow writing in the registers of set 27 of the electrical states imposed not only by the card but also by the sequencer.

In the invention, sequencer 29 controls the input-output circuits, particularly first circuit 20, as a function of the electrical states stored in set 27 of registers to which this sequencer 29 is connected.

A signal available on a pres_cam connection (pres for presence and cam for memory card or smartcard) will hereafter be equated with a register of the register set 27. This connection is made to a limit switch 31. When card 2 is inserted into the slot of reader 1, it depresses switch 31 which, as it closes, imposes a potential (ground or a Vcc potential) on the pres_cam connection. The pres_cam connection is connected to sequencer 29.

Sequencer 29 is a classical sequencing circuit which produces control signals as a function of the electrical status of some of its nodes. In the invention, its nodes are connected to the registers of set 27 (and also to the pres_cam connection). Sequencer 29 can operate independently or, preferably, be clocked by the H signal as seen above.

Following is detailed presentation of the various operations of the reader according to the invention.

1. Connection and turning on of the contacts.

When the presence of the card is detected, a automatic card turn-on sequence is effected by sequencer 29. This is followed by resetting the card to zero.

2. Resetting the card.

The card reset sequence is managed by sequencer 29 ARC without intervention of the associated software implemented by microprocessor 14.

3. Error detection on response to resetting, known as reset.

Error detection is automatic by analyzing a parity bit, and repetition of the card response is controlled automatically by the sequencer. If the character is not repeated within the time required by the standard, the reset sequence is reset automatically.

4. Automatic analysis of response to reset.

Analysis of an initial received character known as TS is done automatically by circuit 23;

Detection of the initial frequency of the cards with internal clocks is thus automatic;

The type of convention used for the polarity of the bits (reverse or straight) is also detected automatically by circuit 23 to transmit data to microprocessor 14 in a convention defined for it and to prevent cumbersome manipulations on the bits of the octets received.

An exclusive OR, as in AND/OR logic, of the octets of the response on reset, reporting the validity of this response, is automatically done by circuit 23. The result is also checked at the end of the exchange by microprocessor 14.

5. Automatic contact turn-off sequence.

Upon detection of withdrawal of the card or a short-circuit, sequencer 29 automatically effects an automatic card turn-off sequence, avoiding short-circuits between contacts.

6. Automatic control of guard time and wait time for characters or blocks.

The character or block guard and wait times are automatically managed by sequencer 29, reducing synchronization constraints in microprocessor 14.

7. Automatic control of programming voltage VPP.

Since a programming voltage VPP must be activated in the octet holding time of the procedure, a time constraint appears. In the invention, this function is effected automatically in coupling circuit 13.

In the description below, the choices of the invention under standard 7816-3 are listed. In particular, the parts of this standard that can be integrated into circuit 13 and the parts that it is preferable to have executed by microprocessor 14 with associated software are determined.

This division of tasks is done without losing sight of the main goals of coupling circuit 13:

rendering microprocessor 14 independent of the synchronizations imposed by card 2;

accepting a maximum number of card types currently on the market.

This information is given with reference in particular to FIG. 2, showing the operational procedures for the various integrated-circuit cards.

A general procedure is applicable to all integrated circuit cards with contacts. It specifies the operations to be carried out for a dialogue between reader 1 and card 2. These are:

1 connection and sequence of turning on the contact pads of circuit 13;

2 resetting card 2

3 response of card 2 and reset to zero 4 eventual exchange of information between card 2 and circuit 13;

5 sequence of turning off the contact pads of circuit 13.

1 connection and turning-on sequence of the contact pads of circuit 13.

The card contact pads must not be turned on until they are connected to circuit 13. The turning on procedure must be in the following sequence:

contact pad cam_rst at a low level known as L, which in practice is the ground in one example;

contact pad cam_vcc powered at a voltage VVC;

contact pad cam_io in receive mode (receiver 21 activated, transmitter 22 deactivated);

contact pad cam_pp resting;

contact pad cam_clk producing a clock signal.

This turning on sequence is effected by a first sequence induced by sequencer 29 as soon as the presence of a card is detected by the pres_cam connection. Preferably, turning on is controlled by microprocessor 14 after it has read the card presence bit (card detector image). Circuit 13 becomes charged in all sequencing cases. In a preferred case, microprocessor 14 handshakes with sequencer 29 to effect the first sequence seen above. Alternatively, this first sequence is triggered by sequencer 29 independently. In the preferred case, microprocessor 14 receiving the card presence signal sends a write order via circuit 23 to write a datum corresponding to the presence of a card in a register of set 27. This datum is of course transmitted to the nodes of sequencer 29 that are connected to this register. And sequencer 29 starts.

2 Resetting card

Once this first sequence has been run, the card must be reset in a second, a third, or a fourth sequence. This reset depends on the type of card one is dealing with. Thus, in tests 32 to 34, the circuit 13 (or the microprocessor 14), recognizes the type of card introduced. In practice, a reset sequence is launched to see whether it works or fails. Preferably, then, the tests follow the second to fourth sequences.

A distinction must be made between two types of cards: asynchronous cards and synchronous cards.

2.1 Asynchronous cards

The clock signal is applied to contact pad cam_clk at a time T0 at which a reset signal, initially in state L, is applied to contact pad cam_rst. Contact pad cam_io must then be in a high-independence state, called Z for simplification, in less than 200 clock cycles. In this state, this contact pad cam_io is capable of receiving a signal. T2 is the time after T0 at which these 200 cycles end, T3 is the time when the first 40,000 cycles end, and T1 is the time when a first signal appears at contact pad cam_io coming from the card.

Here a distinction is made between two types of card:

internal resetting cards for which the response at contact pad cam_io occurs between 400 and 40,000 clock cycles. Test 32 measures the fact that the response occurs during the first 40,000 cycles.

Active resetting cards at the low state for which cards the signal at contact pad cam_rst must be maintained initially at state L for at least 40,000 clock cycles (T3 after T-0). Then the cam_rst contact pad must be placed at a high state, called H, at time T3 and the response must occur at the cam_io contact pad between 400 and 40,000 further clock cycles following T3. Test 33 measures the fact that the response of the card is produced during this third sequence.

If the response does not occur, the card is turned off by circuit 13.

This is a sequence which sequencer 29 handles upon an order from microprocessor 14 transmitted by register set 27. Conversely, circuit 13 delivers a status upon proper execution of the operation. This status is preferably produced by decoding circuit 23. This circuit 23, or possibly another circuit, stores the response received from the card. Depending on the date on which the response is received, or if no response is received, the card type is determined, with the sequencer triggering, for example, during these sequences the writing of information in the registers of set 27. Thus, if the card is not of the asynchronous type, the status is negative, and one then attempts to find out whether it is of the synchronous type.

2.2 Synchronous cards

Circuit 13 then sets all lines at state L, thus contact pad cam_vcc stays powered;

contact pad cam_pp is resting;

contact pads cam_clk and cam_rst remain at L;

contact pads cam_io in receive mode; then contact pad cam_rst is set to H at T0 for at least 50 μs (T12);

contact pad cam_clk receives a clock pulse at level H after a time T10 (greater than 5 μs) after T0. The duration T15 of this pulse is about 10 to 50 μs but with a time T11 being left between the high-to-low transitions at cam_clk and cam_rst that is greater than 5 μs, and finally the response arrives at cam_io when cam_clk is at state L. It is valid after a time T13 (less than or equal to 10 μs) after the high-to-low transition at cam_rst.

This is a sequencing that sequencer 29 handles upon an order from microprocessor 14, also with delivery of a status regarding proper performance of the operation.

These statuses are thus the results of the tests made by circuit 13. They can lead automatically to execution of the third or fourth sequences if the second sequence or third sequence fails if they are written directly in set 27 of the registers.

According to the standard, it is possible to accept several without giving priority to any. One can program the card type that is expected (synchronous or asynchronous) by microprocessor 14 allowing it the choice of trying another type of reset if the status indicates a receive error.

3 Response to reset

In this part a distinction is made between the two types of cards, synchronous and asynchronous, that have previously been identified.

3.1 Asynchronous cards 3.1.1 Definition of initial etu

The etu is the nominal duration of a bit transmitted by the card to contact pad cam_io when there is a response to the signal present at cam_rst. For internal clock cards, the initial etu is 1/9600 second (9600 bauds). For the external clock cards, the relationship between etu and frequency fi of clock signal CLK is etu=372/fi seconds. Frequency fi is in Hz and is between 1 MHz and 5 MHz. This frequency fi which will induce the etu duration is produced by coupling circuit 13. To prevent incompatibilities with certain cards and to be sure of being able to read the response to the reset signal of all the cards (including Japanese cards T=14), it is a good idea to make this frequency fi programmable by microprocessor 14. This is preferably done in a programmable clock generator 30. Generator 30 thus delivers the signal present at the cam_clk contact pad. Generator 30 is programmed directly by clk_sys and clk_sec connections. It could also have been triggered by reading set 27 of the registers.

3.1.2 Character structure during resetting

A character is composed of 10 consecutive bits: a starting bit at a state A, 8 data bits, and a tenth even-parity control bit (bit number at 1 even). The duration between two characters is at least 12 etu (character duration increased by a guard time). During the guard time, the cam_io contact pad must be at Z. The time between two characters must not exceed 9600 etu: initial wait time.

The signal sampling period on the cam_io contact pad, when looking for a start, must be less than 0.2 etu. The guard time can be programmable and the initial wait time may also be programmable.

3.1.3 Error detection and character repetition

If a parity error is detected, receiver 21 transmits an error signal, forcing line cam_io to A for a length of time equal to 1 etu minimum and to 2 etu maximum after the arrival of the parity bit. Then, receiver 21 waits for the character to repeat. If repetition does not take place, the interface device must trigger repetition of the entire reset sequence. This is done with circuit 13. With this goal, receiver 21, if necessary via circuit 23, forces a register of set 27 whose electrical status causes a wait sequence via sequencer 29 lasting 9600 etu. After this wait time, if a character is not received, the sequencer returns to 2.1 above.

3.1.4 Structure and content of response to reset

The response to the reset is composed of a TS character followed by a maximum of 32 characters in the following order:

T0 format character

Tai Tbi Tei Tdi interface characters

T1 T2 . . . Tk historical characters

TCK control character

The interface characters indicate the physical parameters of the integrated circuit in the card and the logical features of the exchange protocol that is to follow. The historical characters give general information on the card.

Circuit 13 confines itself to transmitting these characters to microprocessor 14 through buffer memories 25 (FIFO). The content of the octets corresponding to these characters is analyzed by microprocessor 14 which can then proceed with programming circuit 13 as a function of this analysis to proceed then to exchanges (programming a bit frequency fs for example).

3.1.5 Structure of TS

The initial character TS, on the other hand, furnishes a synchronization sequence at the bit level and fixes coding conventions for the data octets in all the later characters. The synchronization sequence is AZZA. A is an active potential, at 0 volt or at Vx depending on the convention chosen. Z is a potential that appears at the reader contact pad when the output contact pad of the card is set to high impedance and hence does not force a signal. This sequence allows circuit 13 to determine the initial etu of the card (case of internal clock cards). It is equal to one-third the time between the first two high to low transitions of TS.

The following bits code the type of convention, reverse or straight: AAA reverse convention, ZZZ straight convention.

Analysis of this TS character is done by circuit 20 or circuit 23 of circuit 13. It gives information on the initial etu of the internal clock cards and on the convention used. It is possible to transmit octets through buffer memories 24, with the convention established by the microprocessor. However, to avoid it having to manipulate bits that are sometimes difficult to manage, it is sufficient to make the adequate translation on the octets received depending on the convention used by the card and detected in the TS character.

3.1.6 Structure of T0

The heavy-weight quartet Y1 indicates the presence of interface characters TA1 TB1 TC1 TD1.

The light-weight quartet K indicates the number of historical characters.

These quartets are analyzed by microprocessor 14.

3.1.7 Structure of interface characters

They indicate the protocol parameters and the presence of other interface characters:

TDi indicates the type of protocol on its light-weight quartet and the presence of interface parameters i+1 on its heavy-weight quartet.

TA1 TB1 TC1 TB2 are global octets that must be analyzed to process the transmission protocol correctly;

The other interface octets Tai Tbi Tci are the specific interface octets;

TA1 codes parameter F at the heavy weight and D at the light weight. TB1 codes I on bits b7 and b5 and P1 on the 5 light-weight bits;

TC1 codes N;

TB2 codes P2;

F and D are used to determine the working etu (F clock conversion factor, D bit rate adjustment factor).

For the internal clock cards, the working etu has a value of 1/D*9600 in seconds.

For the external clock cards, the working etu has a value of F/D*fs in seconds.

Fs has a minimum value of 1 MHz and a maximum value determined by F.

I and P define the active state of VPP: maximum write current Ipp=ImA, write voltage Vpp=pV.

N is the additional guard time required by the card. Before receiving a character, the card requires a delay of at least 12+N etu starting from the initial front of the preceding character. No additional guard time is used to transmit card characters to the interface device.

All these characters are analyzed by microprocessor 14 and the result of the analysis is used to program circuit 13.

3.1.8 Structure of historical characters

These are processed by microprocessor 14.

3.1.9 Structure of TCK

The value of TCK must be such that the exclusive OU of all the octets from T0 to TDK inclusive is zero. This verification can be done by circuit 13, putting the result of the exclusive OU in a register of set 27 for each octet reception. The microprocessor will then read this register at the end of the response to the reset. This allows the operation of circuit 13 to be checked. Calculation of the exclusive OU is reinitialized each time the card is reset.

3.2 Synchronous cards 3.2.1 Bit rate

The relationship between the bit rate and the clock frequency fi on the cam_clk contact pad is etu=1/fi in seconds, with fi being between 7 KHz and 50 KHz.

3.2.2 Structure of header

The card response contains a 32-bit header. The first two octets are H1 and H2.

3.2.3 Header sequencing

The data output is controlled by clock pulses. The first pulse starts at a time T14 (10 µs<T14<100 µs) after the high to low transition at cam_rst. The high state of the clock pulse lasts for a time T15 (10 µs<T15<50 µs) and the low state for a time T16 (10 µs<T16<100 µs). The data bits can be sampled on the low to high transitions of the clock.

3.2.4 Header content 1 codes the protocol type; H2 codes parameters that depend on the protocol type.

Implementation of the sequencing of the header with circuit 13 poses no problem. The 4 octets are placed in buffer memories, FIFO, and analyzed by microprocessor 14 which verifies the compatibility of the protocols used by the card and by circuit 13, and asks circuit 13 to switch off the contact pads if this compatibility is not possible.

4 Later information exchange, analysis of various protocols 4.1 Protocol T=0

The working wait delay between the initial front of a character transmitted by the card and the initial front of the preceding character (transmitted by the card or by circuit 13) must not exceed 960*D*WI working etu. This maximum value is called working wait time. D and WI are coded in the response to the reset. By default WI has the value of 10.

This working wait time will constitute a character waiting limit in circuit 13. It will be programmed by the microcontroller after validation of the protocol to be used.

The interface device is normally in control when transmitting commands. The latter are comprised of a five-octet header and data octets which are transmitted on the control of the procedure octets transmitted by the card. The error detection and character repetition procedure is the same as for the response to the reset. It is compulsory.

4.1.3 Command header transmitted by the interface device of the invention.

Circuit 13 transmits a header in 5 octets CLA, INS, P1, P2, P3. Circuit 13 must wait for the procedure octets. These 5 octets are placed in the buffer memory of circuit 13 by microprocessor 14 and sent by circuit 13 to the card according to the programmed protocol. The direction of transfer of the information is made known to the microprocessor by INS.

4.1.4 Procedure octets transmitted by card

The procedure octets transmitted by the card are

ACK: VPP and data exchange command;

NULL: to relaunch the working wait time, no action on VPP or on the data;

SW1 followed by SW2: VPP in the rest state and terminates the exchange.

The VPP transition must occur in the guard time of the procedure octet or as soon as the wait time is exceeded.

At each octet repetition, circuit 13 will relaunch a maximum correction wait constituted by the working wait time (whatever the value of the procedure octet received) and memorize the octet in buffer memory 24. Microprocessor 14 analyzes the contents of the octet to find out whether the exchange should continue, whether it should wait, or whether the exchange is complete. To activate the VPP, a minimum amount of analysis must be done on the octet received. Microprocessor 14 must check whether the VPP command procedure octet is active or not. VPP will be active if OCTET+(INS+1) or (COMPL(INS+1) or (VPP active and 60). For all the other values, VPP must be made quiescent. The standard does not indicate whether time must elapse before transmission of data by the interface device after reception of the ACK octet. It is known that the card must respond within the working wait time. One can then leave the initiative of sending data to microprocessor 14 and consequently limit the operations conducted by circuit 13 from this point of view.

4.2 Protocol T=1

For this protocol, a block notion is added. It is organized into 3 layers:

a physical layer following the characteristics defined above;

a data link layer defining a character component and a block component. The character component is identical to that seen above, except for error detection and repetition. The block component is defined by this protocol;

and application layer handling commands and exchange of blocks or block chain.

As in protocol T=0, a character wait time is defined. A block wait time is added to this. The block wait time is defined by the maximum time elapsed between the initial front of the last character granting a transmit authorization to the card and the front of the first character transmitted by the card.

The block guard time is similar to the character guard time defined above. The block guard time is the minimum time elapsed between the initial front of a character and that of the character following in the opposite direction.

All these times are programmed in circuit 13 by appropriate write-entries into register set 27. These writes are done by microprocessor 14 and taken into account by sequencer 29.

The VPP status is controlled by the response of the card in node address octet NAD and the following character PCB. Any transition of VPP must occur within a time of 12 etu calculated from the initial front of the character that triggered this VPP. The NAD character must be analyzed on the fly, without intervention of microprocessor 14, for activation of the VPP.

5 Contact turn-off sequence

When the information exchange is complete or suspended (card silent or card withdrawal detected), the electrical contacts must be turned off according to the following sequence:

contact pad cam_rst at L contact pad cam_clk at L contact pad cam_vpp off contact pad cam_io at A contact pad cam_vcc off.

This is built into circuit 13. The reaction is immediate when the card is pulled out and prevents short circuits between contacts.

6 Selection of PTS protocol type

This exchange between reader 1 and card 2 allows the protocol and its parameters to be established for later exchanges. The response to the reset indicates to the reader the protocol or protocols supported by the card. If several protocols are possible, a PTS is sent by the reader to the card to establish the protocol.

Sequencing:

Reader sends a PTS request;

Card responds with an acknowledgement, otherwise the initial wait time is exceeded;

If the PTS request exchange is satisfactory, the data can follow;

When an error is detected, the reader resets the card or rejects it.

Structure and content of PTS:

request and acknowledgement: 1 initial PTSS character—1 PTS0 format character—3 optional characters with parameters PTS1 PTS2 PTS3—1 control character. Microprocessor 14 writes its PTS request in buffer memory 26 of circuit 13 which sends it and checks to see whether the response arrives within the initial wait time. Circuit 13 then transmits the exclusive OU of the octets to microprocessor 14 which verifies the validity of the response. If the response is not correct, the microprocessor takes the imitative of resetting the card. After a successful PTS exchange, the microprocessor can program circuit 13 for later exchanges.

The tables below describe respectively:

Table 1: types of signals exchanged in the two input-output circuits 20 and 23, I meaning input into reader and O meaning output from reader;

Tables 2 and 3: the names of the registers of set 27, the type of register at L read or E write, the content in octets of cells D7 to D0 of these registers (the names indicated refer to the ISO standard), and the functions of these registers and octets.

TABLE 1

| signal name | type | function |
| --- | --- | --- |
| CPU 14 code | | |
| MCU_SEL | I | microcontroller type (Motorola/Intel) selection |
| MCU_CS | I | module chip select: selection of circuit 13 |
| MCU_DSRD | I | data strobe or read enable (function of MCU_SLE) |
| MCU_RWWR | I | read-write or write enable (function of MU_SEL) |
| MCU_ACK | O | wait or acknowledge (function of MCU-SEL) |
| MCU_IRQ | O | interrupt |
| MCU_ADD(4:0) | I | addresses |
| MCU_DAT(7:0) | I | data |

TABLE 1-continued

| signal name | type | function |
|---|---|---|
| general signals | | |
| RESET | I | general reset |
| CLK_SYS | I | system clock |
| CLK_SEC | I | secondary clock |
| smartcard | | |
| PRES_CAM | I | presence of card |
| CAM_I/O | I/O | memory card I/O |
| CAM_RST | O | memory card reset |
| CAM_CLK | O | memory card clock |
| EN_VPP | O | VPP activation |
| EN_VCC | O | VCC activation |
| PROG_I | O | IPP current programming |
| PROG_P | O | VPP voltage programming |

TABLE 2

| Name | type | D7 | D6 | D5 | D4 | D3 | D2 | D1 | D0 |
|---|---|---|---|---|---|---|---|---|---|
| PROTO | L/E | AS/SY | HI | RC | CP | TP3 | TP2 | TP1 | TP0 |
| FRQ_INI | L/E | FI7 | FI6 | FI5 | FI4 | FI3 | FI2 | FI1 | FI0 |
| FREQ_TRV | L/E | FT7 | FT6 | FT5 | FT4 | FT3 | FT2 | FT1 | FT0 |
| MODE | L/E | SEL_OSC | IT | VPP | TR1 | TR0 | RST | PON | POFF |
| EXE | E | RESET | CHGT_FR | RE | EM | | RST | PON | POFF |
| CWT | L/E | CWT7 | CWT6 | CWT5 | CWT4 | CWT3 | CWT2 | CWT1 | CWT0 |
| CGT | L/E | CGT7 | CGT6 | CGT5 | CGT4 | CGT3 | CGT2 | CGT1 | CGT0 |
| BWT | L/E | BWT7 | BWT6 | BWT5 | BWT4 | BWT3 | BWT2 | BWT1 | BWT0 |
| BGT | L/E | BGT7 | BGT6 | BGT5 | BGT4 | BGT3 | BGT2 | BGT1 | BGT0 |
| I/P | L/E | 0 | I2 | I1 | I0 | P3 | P2 | P1 | P0 |
| MASK_1T | L/E | ARC | | FEE | FRF | OCT | TOB | TOC | TOR |
| FIFO_EM | E | D7 | D6 | D5 | D4 | D3 | D2 | D1 | D0 |
| MANUEL | E | | | | VCC | VPP | RST | CLK | I/O |
| STATUS | L | | | ER_PAR | viol BGT | viol BWT | viol CGT | viol CWT | To_rst |
| OU_EX STATUS IT | L1 | CK7 ARC | CK6 | CK5 FEE | CK4 FRF | CK3 OCT | CK2 TOB | CK1 TOC | CK0 TOR |
| FIFO_RE | L | D7 | D6 | D5 | D4 | D3 | D2 | D1 | D0 |

TABLE 3

| Name | def | |
|---|---|---|
| PROTO | 0 | TP3.0: codes the protocol |
| | 1 | CP: parity check (1) |
| | 0 | RC: character repetition (1) |
| | 1 | HI: internal clock (1) |
| | 0 | AS/SY: asynchronous card (0)/synchronous card (1) |
| FRQ_INI | | codes frequency in CLK for resetting |
| FREQ_TRV | | codes frequency in CLK for later exchanges |
| MODE | | POFF: turns off contacts automatically when card pulled out |
| | | PON: turns on contacts automatically when card inserted |

TABLE 3-continued

| Name | def |
|---|---|
| | RST: automatically resets card when turned on |
| | TRO: automatically transposes data before memorization |
| | TR1: type of data coding in direct fifo (0) inverse fifo (1) |
| | VPP: VPP check at EN_VPP output |
| | IT: generation of it |
| | SEL_OSC: oscillator selection CLK_SYS or CLK_SEC |
| EXE | Causes action to be executed in card in write mode only |
| | Bits are reset as soon as accepted by circuit 13 |
| | POFF: contact turn-off sequence |
| | PON: contact turn-on sequence |
| | RST: reset sequence |
| | EM: transmission of octets contained in FIFO |
| | RE: forces CAM_IO into high impedance mode and toggles into character reception mode |
| | CHGT_FR: causes switching of initial frequency to working frequency |
| | RESET: program reset of circuit 13 |
| CWT | Program character wait time. Before resetting, this will be the initial wait time. After resetting, it will be the wait time. |

TABLE 3-continued

| Name | def |
|---|---|
| CGT | Program guard time between characters, equivalent to N of response to reset |
| BWT | Programming block wait time |
| BGT | Program guard time between blocks |
| I/P | Programming of I and P |
| MASK_1 | its mas |
| T | TOR: reset timeout |
| | TOC: character timeout |
| | TOB: block timeout |
| | OCT: presence of an octet in reception fifo |
| | FRF: FIFO reception full |
| | FEE: fifo transmission empty |
| | RAC: card pullout |
| FIFO_EM | octet to be transmitted |
| MANUAL | manual programming of contacts |
| STATUS | exchange status |
| OU_EX | exclusive OR on octets received |
| STATUS IT | statuses of it reveals what has generated the it |
| FIFO_RE | octets received |

Finally, taking into account problems that can occur in circuit 13 at the time when it reads the card, circuit 13 also has an interrupt control circuit that stops microprocessor 14 or alerts it to the need for urgent action. Circuit 32 receives its information from set 27, and, according to the nature of this information, transmits or does not transmit an interrupt signal.

I claim:

1. Integrated circuit card reader (1) comprising:
   contact pads (3–7) to make contact with the contact pads (8–12) of an integrated circuit card (2);
   a coupling circuit (13) to apply electrical signals to these contact pads or pick electrical signals up from these contact pads;
   a microprocessor (14) to receive, process, and/or transmit these signals available in the coupling circuit;
   said coupling circuit comprises:
   a first input-output circuit (20);
   a set (24) of buffer memories;
   a second input-output circuit (23);
   a set (27) of control registers (28);
   an operations sequencer (29);
   the first input-output circuit (20) being associated with and managing input and output of signals with the contact pads (3–7) of reader (1) and with buffer memory set (24);
   the second input-output circuit (23) being associated with microprocessor (14) and with buffer memory set (24) so that communication between the microprocessor (14) and the memories (24) is via the second input-output circuit;
   the second input-output circuit or the first input-output circuit comprising a decoding circuit connected to register set (27);
   sequencer (29) controlling the input-output circuits as a function of electrical states stored in the registers of the register set.

2. Reader according to claim 1 wherein the coupling circuit (13) comprises:
   a control input to receive a signal reporting the presence of an integrated circuit card in the reader and triggering a first reset sequence, by the sequencer.

3. Reader according to claim 2, wherein the first or the second input-output circuit has a circuit for time measurement of the evolution of electrical states on the reader contact pads during the first sequence.

4. Reader according to claim 2, wherein the second circuit has a circuit for writing electrical states in the registers of the register set (27) during a second sequence according to the first sequence.

5. Reader according to claim 1 wherein the second input-output circuit (33) has a circuit for transmitting electrical states from the microprocessor to the registers of the register set.

6. Reader according to claim 1 wherein the coupling circuit comprises
   a programmable clock,
   a circuit that maintains a potential on one of the reader contact pads for a given duration.

7. Reader according to claim 1 the coupling circuit comprises
   an interrupt circuit (32) for sending an interrupt signal to microprocessor (14).

8. Reader according to claim 1 wherein the coupling circuit comprises a control input to receive a signal reporting the presence of an integrated circuit card in the reader and to detect the withdrawal of said card, and wherein the coupling circuit capable to trigger a contact pads turn-off sequence without the intervention of the microprocessor when withdrawal of the card is detected.

9. Reader according to claim 1 wherein set buffer memories comprise first in, first out memory.

10. Reader according to claim 1 wherein said second input-output circuit (23) is in direct relation with the buffer memories (24) so that data is exchanged directly between said second input-output circuit and said buffer memories.

11. Integrated circuit card reader (1) comprising:
    a connection (3–7) to make contact with a connection (8–12) of an integrated circuit card (2);
    a coupling circuit (13) to apply electrical signals to these connections or pick electrical signals up from these connections;
    a microprocessor (14) to receive, process, and/or transmit these signals available in the coupling circuit
    said coupling circuit comprising:
    a first input-output circuit (20);
    a set (24) of buffer memories;
    a second input-output circuit (23);
    a set (27) of control registers (28);
    an operations sequencer (29);
    the first input-output circuit (20) being connected between the connection of the reader and the buffer memory set, and managing input and output signals between the connection (3–7) of reader (1) and the buffer memory set (24);
    the second input-output circuit (23) being connected between the buffer memory set (24) and the microprocessor (14) so that communication between the microprocessor (14) and the memories (24) is via the second input-output circuit, so that communication between the card (2) and the microprocessor (14) is through the input-output circuits and the memory (24);
    the second input-output circuit or the first input-output circuit comprising a decoding circuit connected to register set (27);
    sequencer (29) controlling the input-output circuits as a function of electrical states stored in the registers of the register set for managing an exchange between the reader and the card in the reader.

12. Integrated circuit card reader (1) comprising:

contact pads (3–7) to make contact with the contact pads (8–12) of an integrated circuit card (2);

a coupling circuit (13) to apply electrical signals to these contact pads or pick electrical signals up from these contact pads;

a microprocessor (14) to receive, process, and/or transmit these signals available in the coupling circuit said coupling circuit comprises:

a first input-output circuit (20), a set (24) of buffer memories, a second input-output circuit (23), a set (27) of control registers (28), and an operations sequencer (29);

the first input-output circuit (20) being associated with and managing input and output of signals with the contact pads (3–7) of reader (1) and with buffer memory set (24);

the second input-output circuit (23) being associated with microprocessor (14) and with buffer memory set (24) so that communication between the microprocessor (14) and the memories (24) is via the second input-output circuit;

the second input-output circuit or the first input-output circuit comprising a decoding circuit connected to register set (27);

sequencer (29) controlling the input-output circuits as a function of electrical states stored in the registers of the register set;

the coupling circuit (13) comprises a control input to receive a signal reporting a presence of an integrated circuit card in the reader and triggering a first reset sequence, by the sequencer;

the first or the second input-output circuit has a circuit for time measurement of an evolution of electrical states on the reader contact pads during the first sequence;

the second circuit has a circuit for writing electrical states in the registers of the register set (27) during a second sequence according to the first sequence;

the second input-output circuit (33) has a circuit for transmitting electrical states from the microprocessor to the registers of the register set;

the coupling circuit comprises a programmable clock, a circuit that maintains a potential on one of the reader contact pads for a given duration; and the coupling circuit comprises an interrupt circuit (32) for sending an interrupt signal to microprocessor (14).

* * * * *